United States Patent [19]

Long

[11] 4,114,861

[45] Sep. 19, 1978

[54] FENCE RAIL CONNECTOR

[76] Inventor: Clyde A. Long, 7106 Pony Tail La., Hyattsville, Md. 20782

[21] Appl. No.: 833,951

[22] Filed: Sep. 16, 1977

[51] Int. Cl.² .......................................... E04H 17/14
[52] U.S. Cl. ..................................... 256/67; 403/189; 403/232.1; 248/219.4
[58] Field of Search ............ 403/187, 189, 191, 232.1, 403/263; 256/65, 66, 67; 248/219.4, 314, 159, 156; 24/160

[56] References Cited

U.S. PATENT DOCUMENTS

| | | | |
|---|---|---|---|
| 2,990,590 | 7/1961 | Graveley | 403/189 |
| 4,005,942 | 2/1977 | Gilb | 403/189 |

FOREIGN PATENT DOCUMENTS

| | | | |
|---|---|---|---|
| 20,230 of | 1898 | United Kingdom | 256/65 |
| 325,612 | 2/1930 | United Kingdom | 256/65 |
| 560,640 | 4/1944 | United Kingdom | 256/65 |
| 1,482,517 | 8/1977 | United Kingdom | 256/66 |

*Primary Examiner*—Wayne L. Shedd

[57] ABSTRACT

An integrally formed backless U-shaped rail-supporting bracket for use in constructing fences, which can be nailed to a fence post with three nails, thus eliminating the need to make a hole in the post or nail the rails to the post. The depth of the bracket is sufficient to hold rails inserted at an angle without mitering up to 20° and with approximate angle mitering for more than 20°.

3 Claims, 4 Drawing Figures

FIG. 1.
FIG. 2.
FIG. 3.
FIG. 4.
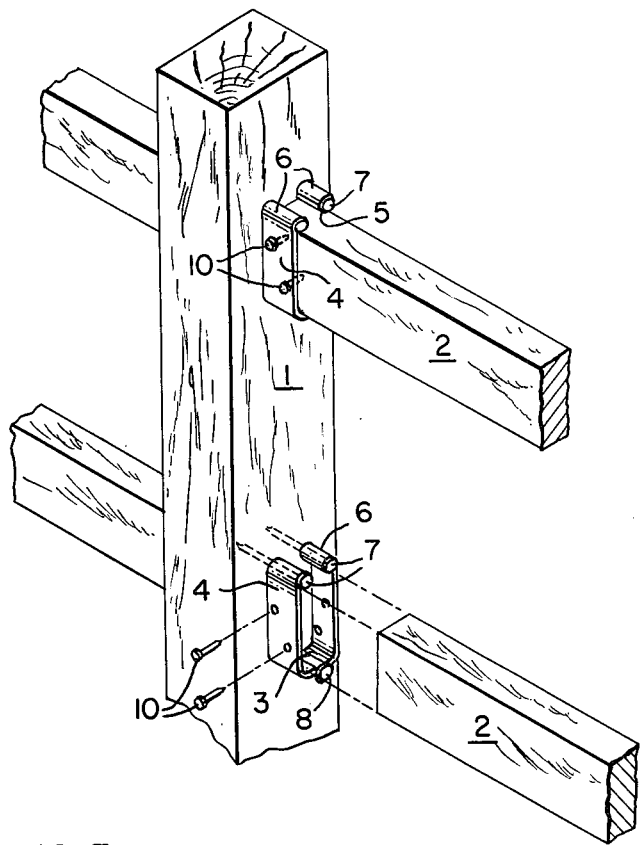
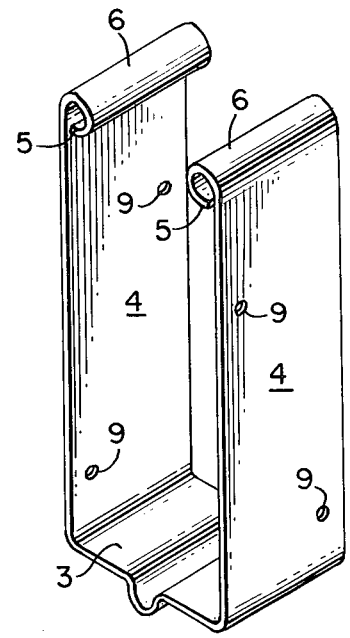
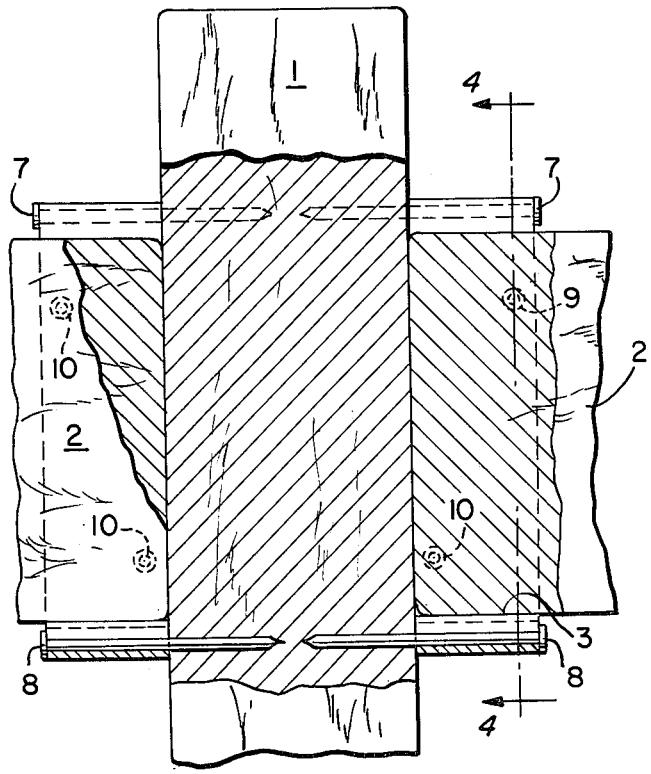
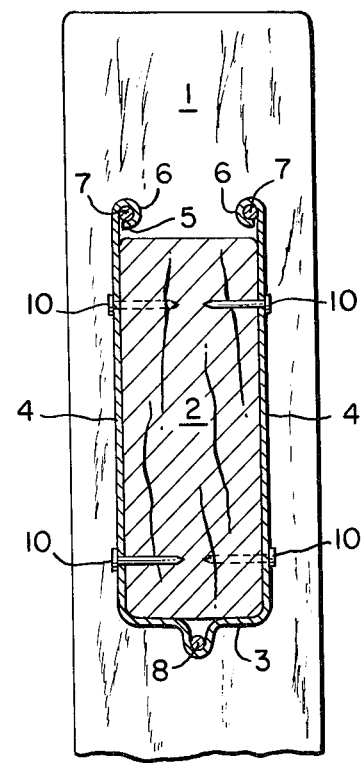

FENCE RAIL CONNECTOR

CROSS-REFERENCE TO RELATED APPLICATION

This invention is not disclosed in any co-pending application for a patent or any issued patent.

DESCRIPTION OF PRIOR ART

U.S. Pat. No. 3,581,461 to Lee discloses a bracket with a back which supports both the bracket and rail.

U.S. Pat. No. 841,771 to Hamilton likewise discloses a bracket with a back which supports both the bracket and the rail.

U.S. Pat. No. 2,608,386 to Hart discloses a third type of bracket in which the back supports both the bracket and the rail.

U.S. Pat. No. 3,601,428 to Gilb discloses a fourth type of bracket in which the back supports both the bracket and the rail.

SUMMARY OF THE INVENTION

The use of brackets to support rails in fences is not new, one advantage of devices such as the present invention being new, one advantage of devices such as the present invention being to the post is eliminated.

The present invention improves upon and differs from others in that it does not have a back piece thus making it easier and more economical to manufacture from a single strip of metal.

Another advantage is that it is secured to the fence post by means of three nails, so that it is quite firmly affixed.

A further advantage is that it is deep enough to hold a rail inserted at an angle of up to 20° without mitering, and a rail inserted at an angle of up to 20° with approximate angle mitering.

A further advantage is that it provides a means for lock-tight clamping of the rails whether inserted at an angle or not.

It is further constructed so that in the absence of the clamp the rails may be removed with ease.

BRIEF DESCRIPTION OF THE DRAWINGS

FIG. 1 is a perspective view showing the upper bracket affixed to a fence post and the lower bracket before the rail is inserted;

FIG. 2 is a perspective view of the bracket constructed in accordance with the present invention;

FIG. 3 is a side cross-sectional view showing the invention affixed to opposite sides of a fence post; and FIG. 4 is a cross-sectional view taken substantially along the line 4—4 in FIG. 3 showing in cross-section the side nails which provide the clamping means.

STRUCTURE OF DISCLOSED EMBODIMENT

The fence post, 1, is composed of wood or some other material into which a nail may be driven.

The rail-supporting bracket is composed of a single strip of metal of sufficient width to support a rail, 2, at an angle of 20° without mitering, or an angle of greater than 20° with approximate angle mitering. It is bent into a right angle U-shape consisting of a base, 3, and two uniform upwardly extending parallel walls, 4, of greater height than the distance between them. The upper horizontal edge of each wall, 5, is curved inwardly to form a complete cylinder, 6, running from front to back of sufficient diameter to permit a nail, 7, to be driven through it and into the fence post.

At the center of the base, 3, the metal forms a semicylindrical curve, 8, downwardly extending from front to back parallel to the upper horizontal edges of the walls and of sufficient vertical depth to allow a nail to be driven along it below the level of the base, 3.

Through each of the walls, 4, there are two holes, 9, placed inversely opposite each other both horizontally and vertically through which nails, 10, may be driven into but not through the rail, 2, to form a fixed lock clamp.

Although the present invention has been described with reference to a particular embodiment thereof, it should be understood that those skilled in the art may make many other modifications and embodiments thereof which will fall within the spirit and scope of the principles of this invention.

What is claimed as new and desired to be secured by patent of the United States is:

1. In a post and rail fence, rail supporting brackets consisting of a single strip of metal bent at right angles to form a horizontal base with two parallel walls extending upwardly an equal distance, the upper horizontal edges being curved inwardly to retain a nail driven horizontally into the post, the center of the base being curved downwardly in a semicylinder extending horizontally parallel to the upper curved edges and of a sufficient depth so that a nail driven along it would be below the horizontal plane of the base, whereby said bracket is attached to the post solely through its sides and bottom.

2. A rail supporting bracket as described in claim 1 formed from a strip of metal of sufficient width and depth to support a rail inserted at a substantial angle without mitering.

3. A rail supporting bracket as described in claim 1 with two apertures through each wall placed horizontally and vertically inversely opposite each other of sufficient diameter to allow nails to be driven through them into the rails.

* * * * *